US006567650B1

(12) United States Patent
Kitamura et al.

(10) Patent No.: US 6,567,650 B1
(45) Date of Patent: May 20, 2003

(54) PORTABLE TERMINAL DEVICE

(75) Inventors: Toshiyasu Kitamura, Kanagawa (JP); Makoto Tamaru, Kanagawa (JP); Mamoru Yoshida, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/499,187

(22) Filed: Feb. 7, 2000

(30) Foreign Application Priority Data

Feb. 12, 1999 (JP) .......................................... 11-034701

(51) Int. Cl.$^{7}$ .................................................. H04B 1/38

(52) U.S. Cl. .......................................... 455/90; 361/816

(58) Field of Search ............................ 379/368; 455/90, 455/550, 575; 200/314, 305; 174/35 R; 361/816

(56) References Cited

U.S. PATENT DOCUMENTS

| | | | | |
|---|---|---|---|---|
| 5,512,718 A | * | 4/1996 | Larose | 200/310 |
| 5,844,166 A | * | 12/1998 | Halttunen et al. | 174/35 R |
| 5,963,434 A | * | 10/1999 | Jonsson et al. | 174/250 |

FOREIGN PATENT DOCUMENTS

| | | |
|---|---|---|
| DE | 84 29 030 U | 11/1986 |
| DE | 36 28 781 A | 3/1987 |
| DE | 195 45 999 A | 6/1997 |
| DE | 196 46 998 A | 5/1998 |
| JP | 58-122323 | 8/1983 |
| JP | 60-57022 | 4/1985 |

OTHER PUBLICATIONS

Patent Abstract of Japan, Publication No. Sho. 58–122323, Publication Date Aug. 20, 1983.

Patent Abstract of Japan, Publication No. Sho. 60–57022, Publication Date Apr. 20, 1985.

* cited by examiner

*Primary Examiner*—Dwayne Bost
*Assistant Examiner*—Yuwen Pan
(74) *Attorney, Agent, or Firm*—Pearne & Gordon LLP

(57) ABSTRACT

A printed board placed on a lower case of a portable terminal device comprises a circuit pattern for realizing electric connection based on the key button operation via a key pad, an LED for irradiating characters or numbers on the key buttons with a light, a black printing printed/coated with a low reflector for eliminating the light irregularity, and white printings printed/coated with a high reflector for eliminating the light irregularity.

8 Claims, 10 Drawing Sheets

PORTABLE TERMINAL DEVICE

BACKGROUND OF THE INVENTION

The present invention relates to a portable terminal device, in particular, it relates to that having a configuration capable of improving the light irregularity at the time of irradiating keys with a light by sectioning a printed board into a portion printed/coated with a high reflector (such as a white ink) and a portion printed/coated with a low reflector (such as a black ink).

FIG. 10 shows an example of arrangement of a key sheet of a conventional portable terminal device. A circuit pattern 2 for electrical connection according to operation of key buttons, and an LED 3 for irradiating the key buttons with a light are provided on the printed board 1. The printed board 1 is applied with a white printing 4 (see the portion marked with slant lines in FIG. 10) except the positions of the circuit pattern 2 and the LED 3. This method has been used commonly as a method for improving the luminance at the time of irradiating keys with a light by applying a white printing 4 on the printed board 1 so as to diffuse the light of the LED 3 disposed on the same surface of the printed board 1.

In this case, since the luminance of the peripheral key buttons are relatively lower with respect to the key buttons disposed in the center array having the LED arranged on the right and the left, the luminance variance (irregularity) is generated when it is viewed as a whole at the time of light irradiation, and thus it is problematic in terms of homogeneity.

As a method for improving the same, conventionally, a method shown in FIGS. 11 and 12 has been practiced. That is, generation of light irregularity has been prevented skillfully by adopting designs of applying the white printing on the rear side of the key buttons close to the LED at the side facing to the key sheet by a larger number of times compared with the other key buttons (see FIG. 11), or by applying the white printing on the entirety of the buttons in the center array, interposed between the LED and applying the white printing only by half of the surface of the peripheral buttons so as to have difference in terms of the light transmissivity (see FIG. 12).

FIG. 13 is a cross-sectional view of a conventional portable terminal device comprising an upper case 5, a lower case 6, a key pad 7, and a printed board 1 with light emitting elements (LED) 3 mounted thereon, applied with the design shown in FIG. 12. It is shown in FIG. 13 that a white printing 4 is applied on a printed board 1, and a white printing is also applied around the key pad buttons for having difference in terms of the light transmissivity so as to prevent generation of light irregularity.

However, since a method of achieving a light weight of buttons by hollowing the rear side of the buttons in various shapes has been used commonly with the recent trend toward a small size and a light weight, a problem arises in that only the portion remained after hollowing can be printed and thus the light irregularity at the time of light irradiation cannot be improved.

SUMMARY OF THE INVENTION

Accordingly, an object of the present invention is to provide a portable terminal device for improving the light irregularity at the time of irradiating keys with a light by sectioning a printed board into a portion printed/coated with a high reflector (such as a white ink) and a portion printed/coated with a low reflector (such as a black ink).

A portable terminal device according to the present invention comprises a casing having an upper case and a lower case; a printed board with light emitting elements mounted thereon; and a key pad fit with the upper case, the key pad being translucent, wherein a high reflecting portion and a low reflecting portion are disposed on a part of the printed board.

Since a first aspect of the invention is a portable terminal device comprising an upper case, a lower case, a key pad, and a printed board with light emitting elements mounted thereon, wherein a high reflector is printed on the plate surface of a key switch portion of the printed board, and a low reflector is printed on a part thereof, the effect of improving the light irregularity at the time of irradiating keys with a light can be achieved.

Moreover, since a second aspect of the invention is a portable terminal device comprising an upper case, a lower case, a key pad, and a printed board with light emitting elements mounted thereon, wherein a high reflector is coated on the plate surface of a key switch portion of the printed board, and a low reflector is coated on a part thereof, the effect of improving the light irregularity at the time of irradiating keys with a light can be achieved.

Furthermore, since a third aspect of the invention is a portable terminal device comprising an upper case, a lower case, a keypad, and a printed board with light emitting elements mounted thereon, wherein a low reflector is printed on the vicinity of the substantial center of the plate surface of a key switch portion of the printed board lengthwise, and a high reflector is printed on the portion where the low reflector is not printed thereon, the effect of improving the light irregularity at the time of irradiating keys with a light can be achieved.

Moreover, since a fourth aspect of the invention is a portable terminal device comprising an upper case, a lower case, a key pad, and a printed board with light emitting elements mounted thereon, wherein a low reflector is coated on the vicinity of the substantial center of the plate surface of a key switch portion of the printed board, and a high reflector is coated on the portion where the low reflector is not printed thereon, the effect of improving the light irregularity at the time of irradiating keys with a light can be achieved.

Furthermore, since a fifth aspect of the invention is a portable terminal device comprising an upper case, a lower case, a key pad, and a printed board with light emitting elements mounted thereon, wherein a high reflector is adhered on the plate surface of a key switch portion of the printed board, and a low reflector is adhered on a part thereof, the effect of improving the light irregularity at the time of irradiating keys with a light can be achieved.

Moreover, since a sixth aspect of the invention is a portable terminal device comprising an upper case, a lower case, a key pad, and a printed board with light emitting elements mounted thereon, wherein a low reflector is adhered on the vicinity of the substantial center of the plate surface of a key switch portion of the printed board, and a high reflector is adhered on the portion where the low reflector is not printed thereon, the effect of improving the light irregularity at the time of irradiating keys with a light can be achieved.

Moreover, since a seventh aspect of the invention is a portable terminal device comprising an upper case, a lower case, a key pad, and a printed board with light emitting elements mounted thereon, wherein the low reflector is disposed on a portion where an intensity of illumination of the lighting emitting elements is high.

According to the above-mentioned configurations, the light irregularity at the time of irradiating keys with a light can be improved in a portable terminal device with a small size and a light weight.

DESCRIPTION OF THE PREFERRED EMBODIMENTS

Hereinafter, embodiments of the invention will be explained with reference to the accompanied drawings.

Figure 1:
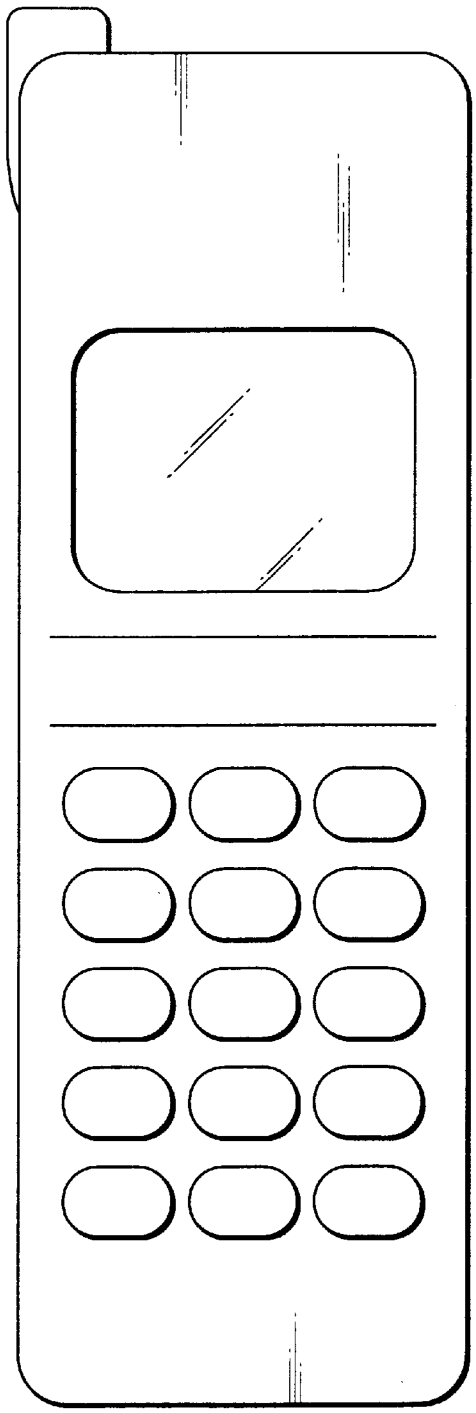
FIG. 1 is an external appearance plan view of a portable terminal device, such as a portable phone according to an embodiment of the invention.

FIG. 1 is an external appearance plan view of a portable terminal device, such as a portable phone according to an embodiment of the invention. Key buttons are shown schematically in the lower half portion of the figure. The invention is for eliminating the light irregularity in the external surface of key buttons as a whole at the time of irradiating the key buttons with a light from below by an LED mounted on a printed board via a translucent key pad 29 (not illustrated in FIG. 1) for facilitating the key button operation in a dark place.

Figure 2:
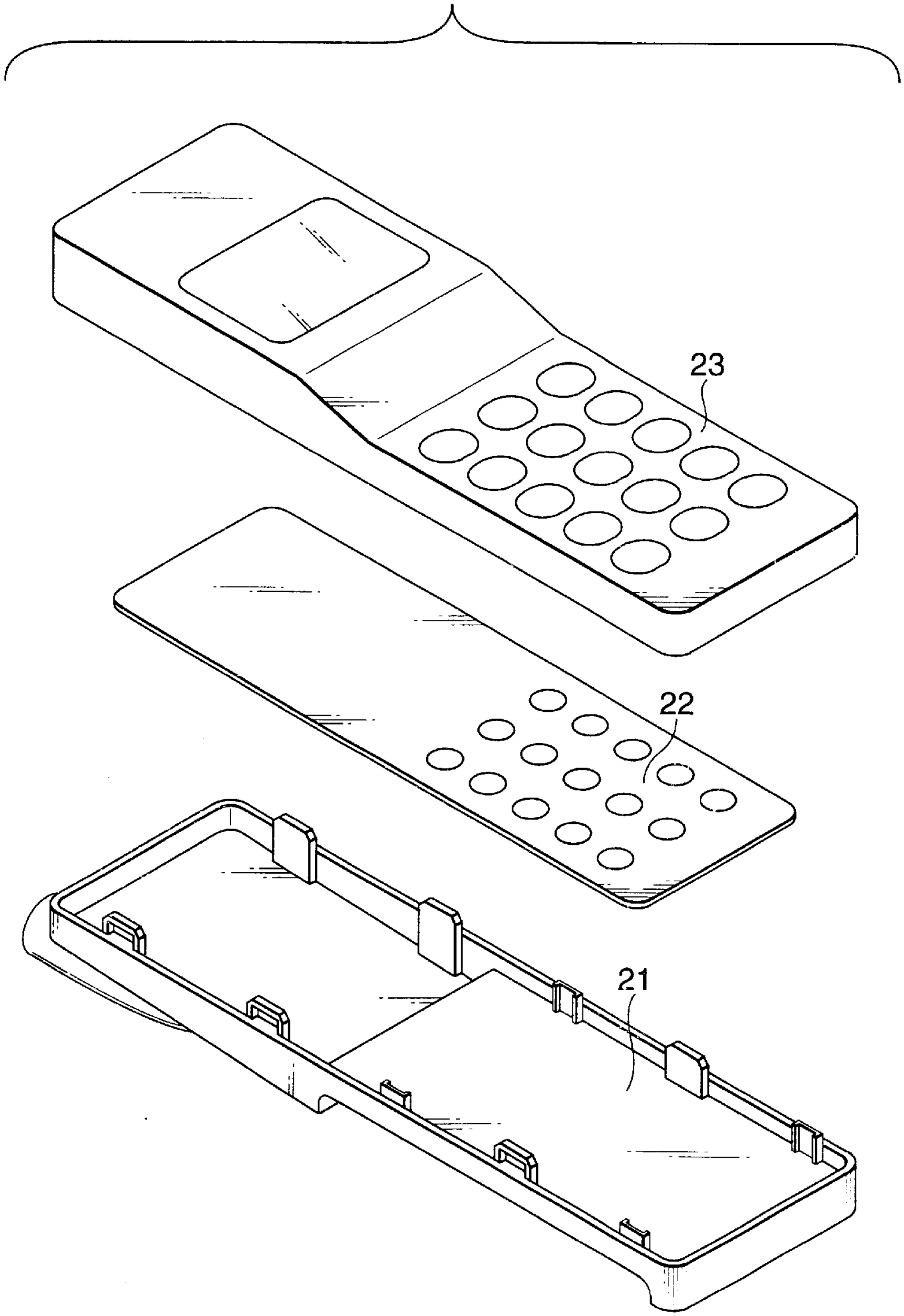
FIG. 2 is an exploded perspective view of the portable phone according to the embodiment of the invention.

FIG. 2 is an exploded perspective view of the portable phone of FIG. 1. In FIG. 2, the portable phone comprises a printed board 22 placed on a lower case 21, and an upper case 23 with a key pad 29 (not illustrated in FIG. 2) which is translucent mounted further placed thereon.

Figure 3:
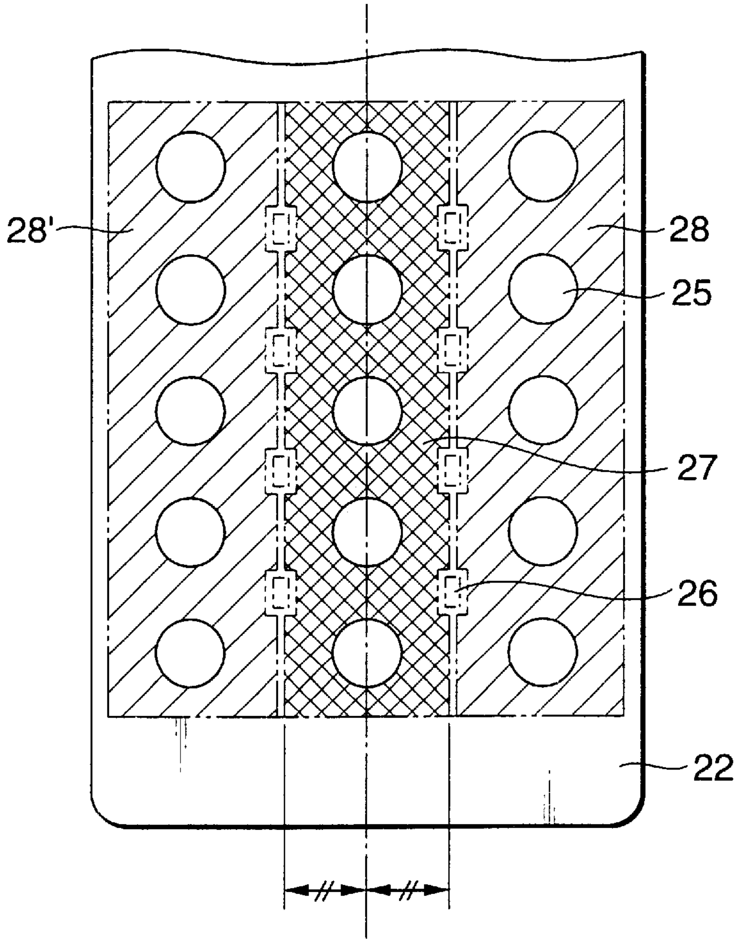
FIG. 3 is a diagram showing a key sheet arrangement on a printed board according to the embodiment of the invention.

FIG. 3 shows the arrangement in the key sheet on the printed board of FIG. 2. In FIG. 3, the printed board comprises a circuit pattern 25 for realizing electric connection based on the key button operation via the key pad 29 (not illustrated in FIG. 3), an LED 26 for irradiating characters or numbers on the key buttons with a light, a black printing 27 printed/coated with a low reflector for eliminating the light irregularity, and white printings 28, 28' printed/coated with a high reflector for eliminating the light irregularity.

In the embodiment shown in FIG. 3, the LED 26 are disposed with the equal distance with respect to the center array of the key button arrangement. Therefore, since the key buttons at the right and left arrays receive only the light from the right or left LED 26 whereas the key buttons at the center array receive the light from LED 26 at both right and left arrays, the right irregularity cannot be prevented as it is when the key buttons are irradiated with a light.

Therefore, a black printing (low reflector) 27 is applied to the center key button array to the mounting position of the right and left LED 26, and white printings (high reflector) 28, 28' are applied to the right or left key button array from the end portion of the key sheet and to the mounting position of the LED 26. Accordingly, a portable terminal device without light irregularity at the time of irradiating keys with a light can be obtained.

Figure 4:
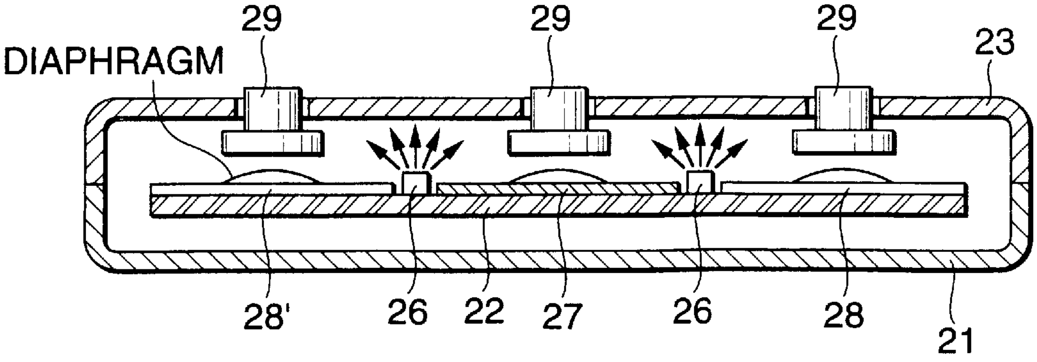
FIG. 4 is a cross-sectional view of the portable terminal device comprising an upper case, a lower case, a key pad, and a printed board with light emitting elements mounted thereon according to the embodiment of the invention.

FIG. 4 is a cross-sectional view of the portable terminal device according to the invention comprising the upper case 23, the lower case 21, the key pad 29 and the printed board 22 with the light emitting elements 26 mounted thereon explained above.

In FIG. 4, a black printing (low reflector) 27 is applied to the center key button array to the mounting position of the right and left LED 26, and white printings (high reflector) 28, 28' are applied to the right or left key button array from the end portion of the key sheet and to the mounting position of the LED 26 on the printed board 22. Accordingly, a portable terminal device without light irregularity at the time of irradiating keys with a light can be obtained.

Figure 5:
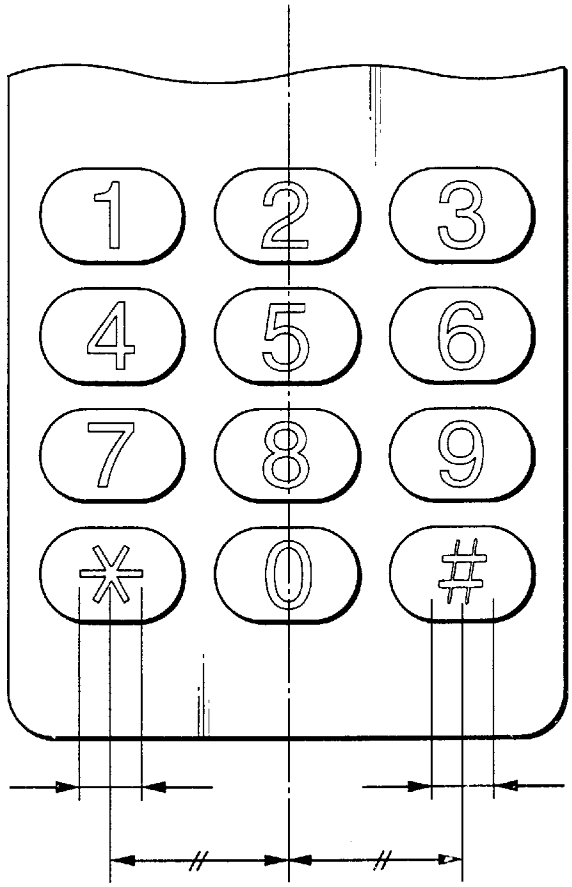
FIG. 5 is a diagram showing a key button arrangement with a character or a number applied/printed in the center of the key buttons in the portable terminal device according to the embodiment of the invention.

Since only the portion with a character or a number printed transmits a light in a key button, the other peripheral portion of the key button needs not transmit the light. Therefore, in the case the light irregularity countermeasure shown in FIG. 3 is applied, it is adequate that a character or a number is applied or printed in a position of the key button as shown in FIG. 5. That is, a number is applied at the center position of the key button in the example of the center key button arrangement.

Figure 6:
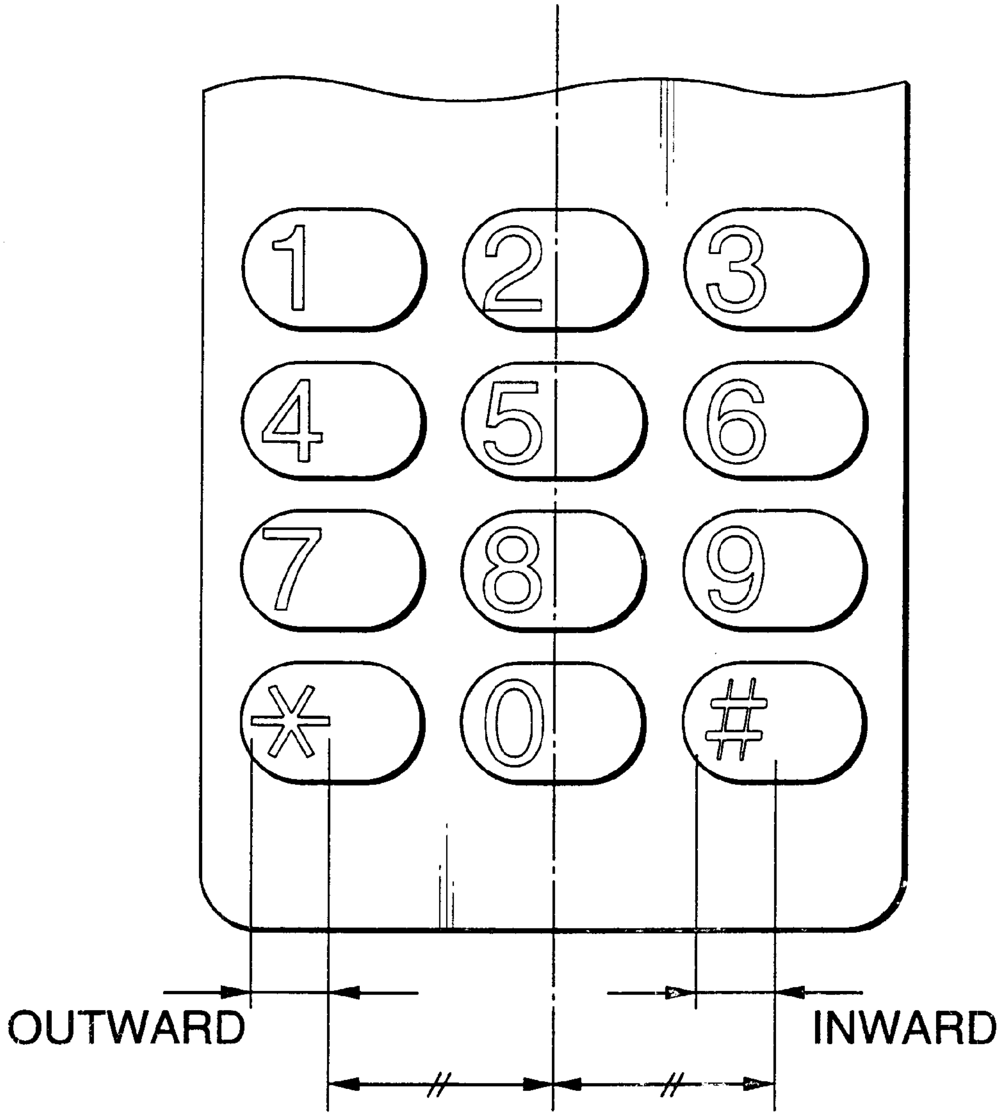
FIG. 6 is a diagram showing a key button arrangement with a character or a number applied/printed leftward with respect to the center of the key buttons in the portable terminal device according to the embodiment of the invention.

On the other hand, in the case a character or a number is applied or printed at a position leftward with respect to the center position of the key button as shown in FIG. 6, the light irregularity is generated with the countermeasure shown in FIG. 3. Therefore, as shown in FIG. 7, a black printing (low reflector) 27 is applied to the key button arrangement in the center array to the right end of the left side LED array (distance A from the center line) so that the black printing portion is provided narrower than the case shown in FIG. 3, and conversely, the black printing (high reflector) 27 is applied to the key button arrangement in the center array to the right end of the right side LED array (distance A+$\alpha$) so that the black printing portion is provided wider than the case shown in FIG. 3.

In terms of the white printings (high reflector) 28, 28', the white printing (high reflector) 28 is provided narrower than the case shown in FIG. 3, and conversely, the white printing (high reflector) 28' is provide wider than the case shown in FIG. 3.

Accordingly, also in the case characters or numbers are applied or printed leftward with respect to the center position of the key buttons as shown in FIG. 6, a portable terminal device without light irregularity at the time of irradiating keys with a light can be obtained.

Figure 7:
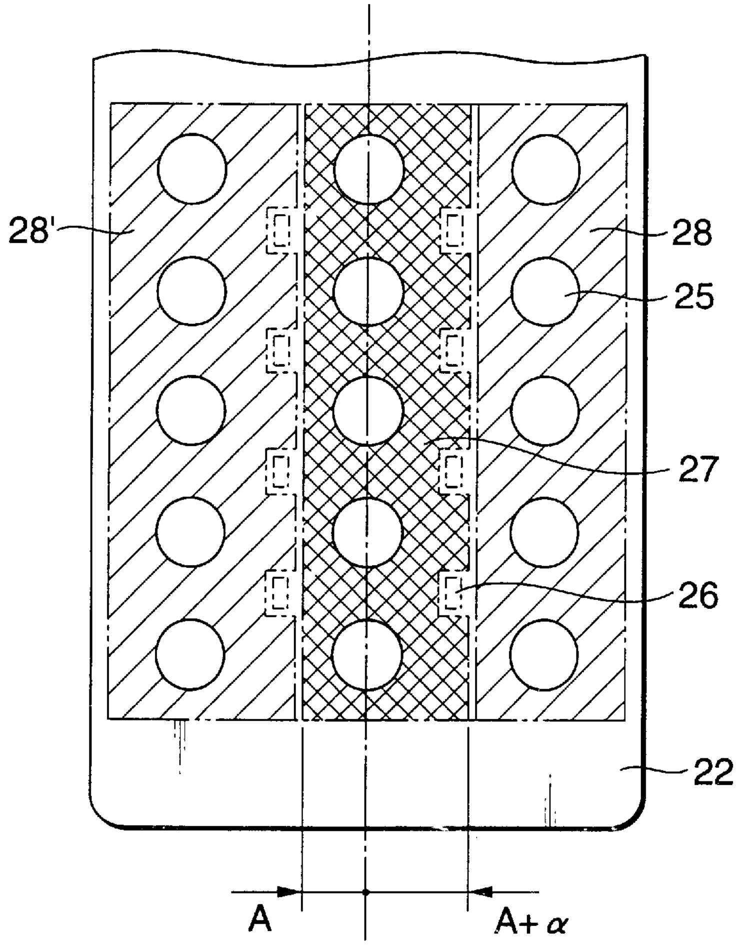
FIG. 7 is a diagram showing a key sheet arrangement for the key button arrangement shown in FIG. 5.

It is apparent that the white printing (high reflector) 28 is applied wider than the case shown in FIG. 3 and conversely, the white printing (high reflector) 28' is applied narrower than the case shown in FIG. 3 opposite to the case shown in FIG. 7 in the case characters and numbers are applied rightward with respect to the center position of the key buttons opposite to the case shown in FIG. 6. Accordingly, the position of the black printing is opposite to the case shown in FIG. 6.

Figure 8:
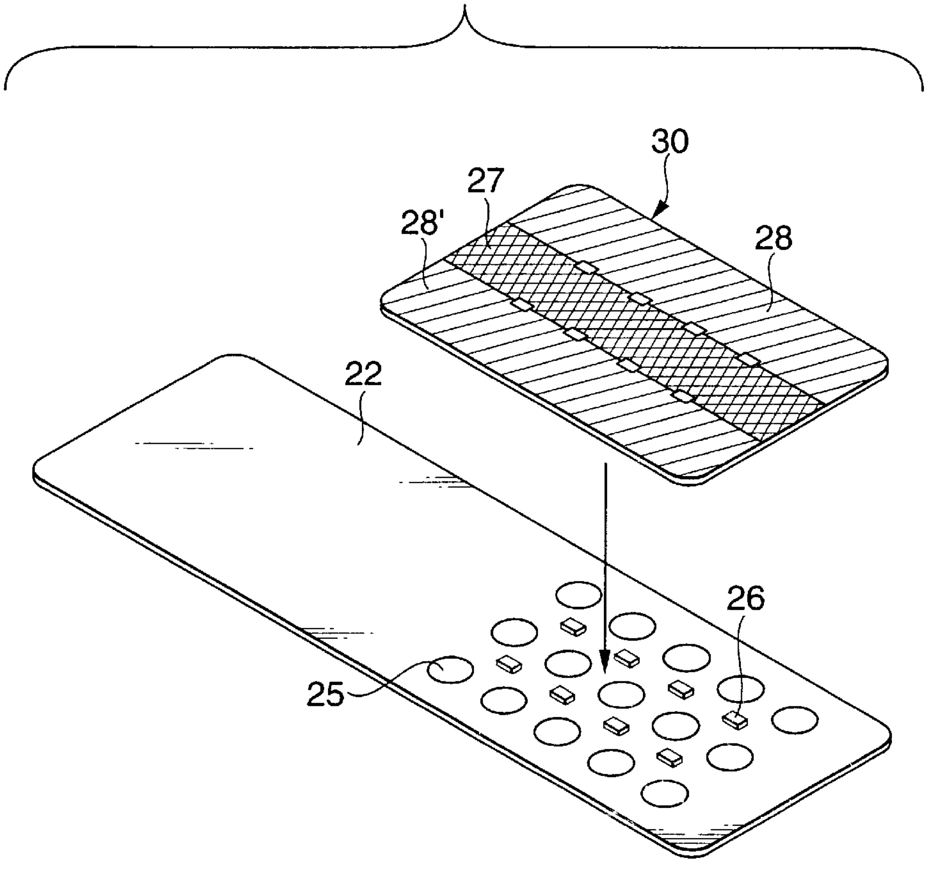
FIG. 8 is a diagram showing the configuration of a sheet material applied with a coloring treatment of a white printing and a black printing to be adhered on the plate surface of the key button operation portion of the printed board according to another embodiment of the invention.

Moreover, the high reflector and the low reflector can be a sheet material applied with a coloring treatment in white or black. For example, in FIG. 8, a sheet material 30 applied with a coloring treatment of white printings 28, 28' printed/coated with a high reflector and a black printing 27 printed/coated with a low reflector is attached on the plate surface of the key button operation portion of the printed board 22.

The effect the same as the embodiment of printing can be achieved in the configuration of attaching the sheet material applied with a coloring treatment of the high reflector and the low reflector on the printed board 22.

Moreover, as to the range of printing/coating the high reflector and the low reflector, the black printing as the low reflector is not necessarily printed/coated in a strip-like shape in the vicinity of the center as shown in FIGS. 3 and 7, but can be divided in a plurality of portions.

Figure 9:
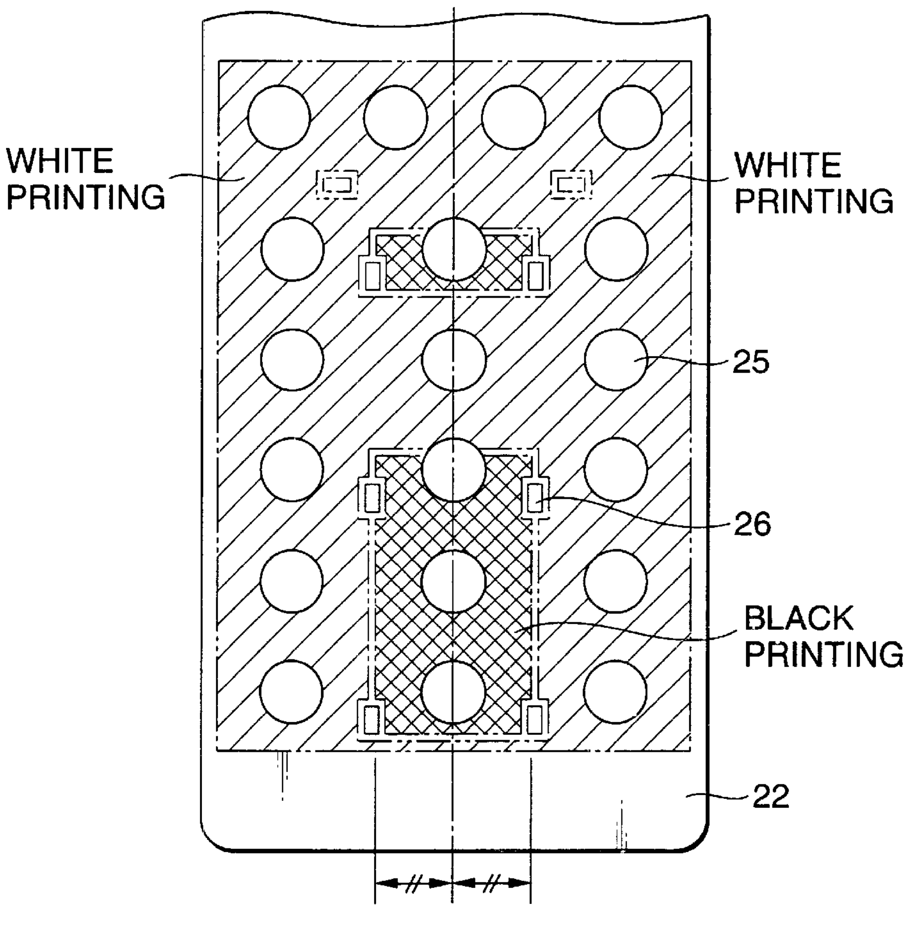
FIG. 9 is a diagram showing the configuration provided with a black printing in a plurality of portions on the printed board according to the embodiment of the invention.
Figure 10:
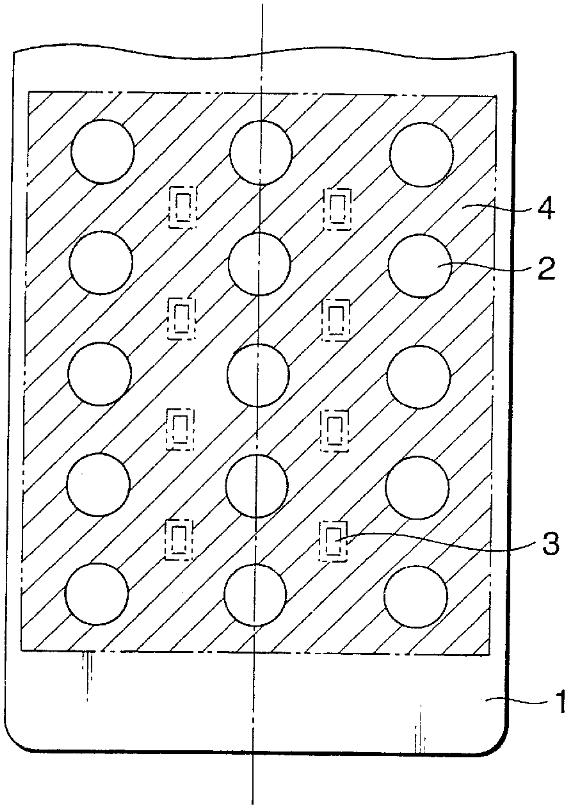
FIG.10 PRIOR ART
FIG. 10 is a diagram showing a conventional key sheet arrangement on a printed board.
Figure 11:
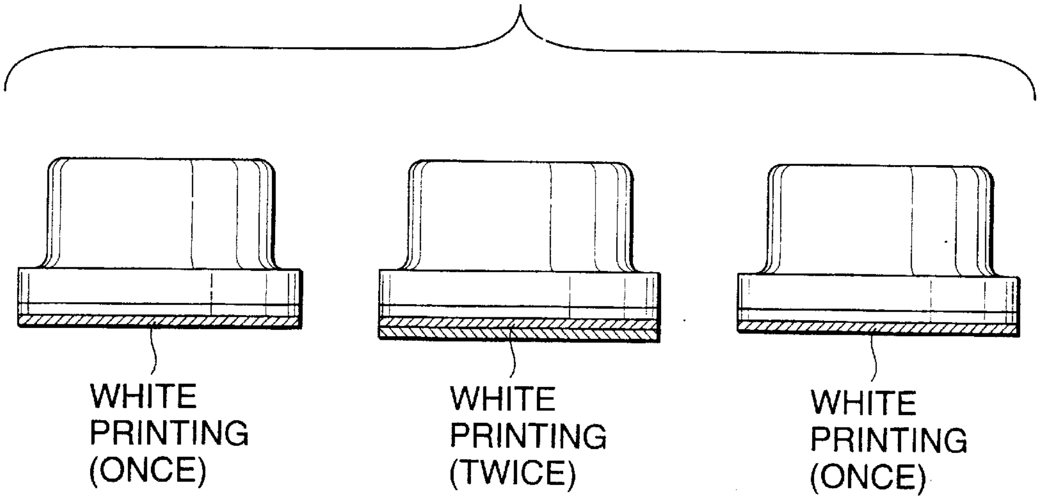
FIG.11 PRIOR ART
FIG. 11 is a diagram showing a first conventional measure for preventing the light irregularity.
Figure 12:
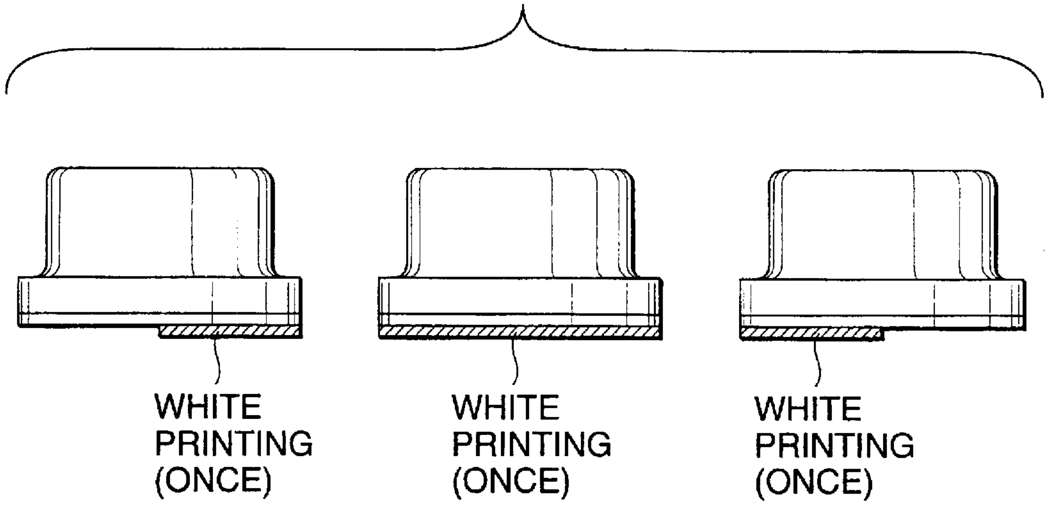
FIG.12 PRIOR ART
FIG. 12 is a diagram showing a second conventional measure for preventing the light irregularity.
Figure 13:
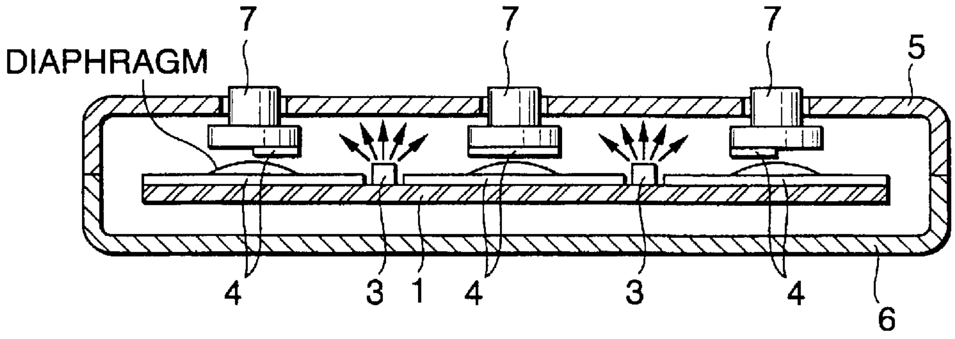
FIG.13 PRIOR ART
FIG. 13 is a cross-sectional view of a portable terminal device applied with the second conventional measure for preventing the light irregularity.

As an example thereof, FIG. 9 shows a configuration with the black printing as the low reflector is provided in two portions in the vicinity of the center. Since the LED are not provided evenly in this embodiment, if the black printing is provided like a strip without disposing in the two portions, the vicinity of the center becomes dark.

Therefore, by providing the black printing portions in a plurality of positions according to the arrangement of the LED, the effect the same as that of the embodiments shown in FIGS. 3 and 7 can be achieved. Moreover, the method of providing the black printing in a plurality of positions can be adopted in the case of the sheet material shown in FIG. 8.

As heretofore explained, a portable terminal device according to the invention comprises an upper case, a lower case, a key pad, and a printed board with light emitting elements mounted thereon, wherein a high reflector is printed/coated on the plate surface of a key switch portion of the printed board, and a low reflector is printed/coated on a part thereof.

Moreover, a portable terminal device according to the invention comprises an upper case, a lower case, a key pad, and a printed board with light emitting elements mounted thereon, wherein a low reflector is printed/coated on the vicinity of the substantial center of the plate surface of a key switch portion of the printed board, and a high reflector is printed/coated on the portion where the low reflector is not printed/coated thereon.

Furthermore, a portable terminal device according to the invention comprises an upper case, a lower case, a key pad, and a printed board with light emitting elements mounted thereon, wherein a high reflector is adhered on the plate surface of a key switch portion of the printed board, and a low reflector is adhered on a part thereof.

Accordingly, the effect of improving the light irregularity at the time of irradiating keys with a light can be achieved in a portable terminal device with a small size and a light weight.

What is claimed is:

1. A portable terminal device comprising:

a casing having an upper case and a lower case;

a printed board with light emitting elements mounted thereon;

a key pad fit with said upper case, said key pad being translucent;

a high reflecting portion; and a low reflecting portion, wherein the high reflecting portion and the low reflecting portion are disposed on a part of said printed board defined by an area of the key pad.

2. The portable terminal device according to claim 1, wherein a high reflector is printed on said high reflecting portion, and a low reflector is printed on said low reflecting portion.

3. The portable terminal device according to claim 1, wherein a high reflector is coated on said high reflecting portion, and a low reflector is coated on said low reflecting portion.

4. The portable terminal device according to claim 1, wherein a high reflector is adhered on said high reflecting portion, and a low reflector is adhered on said low reflecting portion.

5. The portable terminal device according to claim 1, wherein said low reflecting portion is disposed in the vicinity of the substantial center of the plate surface of the printed board lengthwise, and said high reflecting portion is disposed on a portion where said low reflecting portion is not disposed.

6. The portable terminal device according to claim 1, wherein said low reflecting portion is disposed on a portion where an intensity of illumination of the light emitting elements is high.

7. A portable terminal device comprising:

a casing having an upper case and a lower case;

a printed board with light emitting elements mounted thereon; and a key pad fit with said upper case, said key pad being translucent;

wherein the high reflecting portion and the low reflecting portion are disposed on a part of said printed board;

wherein said low reflecting portion is disposed in the vicinity of the substantial center of the plate surface of the printed board lengthwise, and said high reflecting portion is disposed on a portion where said low reflecting portion is not disposed.

8. A portable terminal device comprising:

a casing having an upper case and a lower case;

a printed board with light emitting elements mounted thereon; and a key pad fit with said upper case, said key pad being translucent;

wherein the high reflecting portion and the low reflecting portion are disposed on a part of said printed board;

wherein said low reflecting portion is disposed on a portion where an intensity of illumination of the light emitting elements is high.

* * * * *

UNITED STATES PATENT AND TRADEMARK OFFICE

CERTIFICATE OF CORRECTION

PATENT NO. : 6,567,650 B1
DATED : May 20, 2003
INVENTOR(S) : Toshiyasu Kitamura et al.

It is certified that error appears in the above-identified patent and that said Letters Patent is hereby corrected as shown below:

Title page, Item [54] and Column 1, line 1,
Title, please delete "PORTABLE TERMINAL DEVICE", and insert therefor
-- PORTABLE TERMINAL DEVICE WITH GENERALLY REGULAR ILLUMINATION --.

Signed and Sealed this

Twenty-third Day of December, 2003

JAMES E. ROGAN
*Director of the United States Patent and Trademark Office*